June 1, 1937. L. C. KARRICK Re. 20,392

PROCESS OF DESTRUCTIVE DISTILLATION OF CARBONACEOUS MATERIAL

Original Filed June 23, 1928 2 Sheets-Sheet 1

INVENTOR

Lewis C. Karrick

June 1, 1937. L. C. KARRICK Re. 20,392

PROCESS OF DESTRUCTIVE DISTILLATION OF CARBONACEOUS MATERIAL

Original Filed June 23, 1928 2 Sheets-Sheet 2

INVENTOR

Curtis C. Karrick

Reissued June 1, 1937 Re. 20,392

UNITED STATES PATENT OFFICE 20,392

PROCESS OF DESTRUCTIVE DISTILLATION OF CARBONACEOUS MATERIAL

Lewis C. Karrick, Salt Lake City, Utah

Original No. 2,011,054, dated August 13, 1935, Serial No. 287,815, June 23, 1928. Application for reissue September 11, 1936, Serial No. 100,397

11 Claims. (Cl. 202—16)

Figure 1:
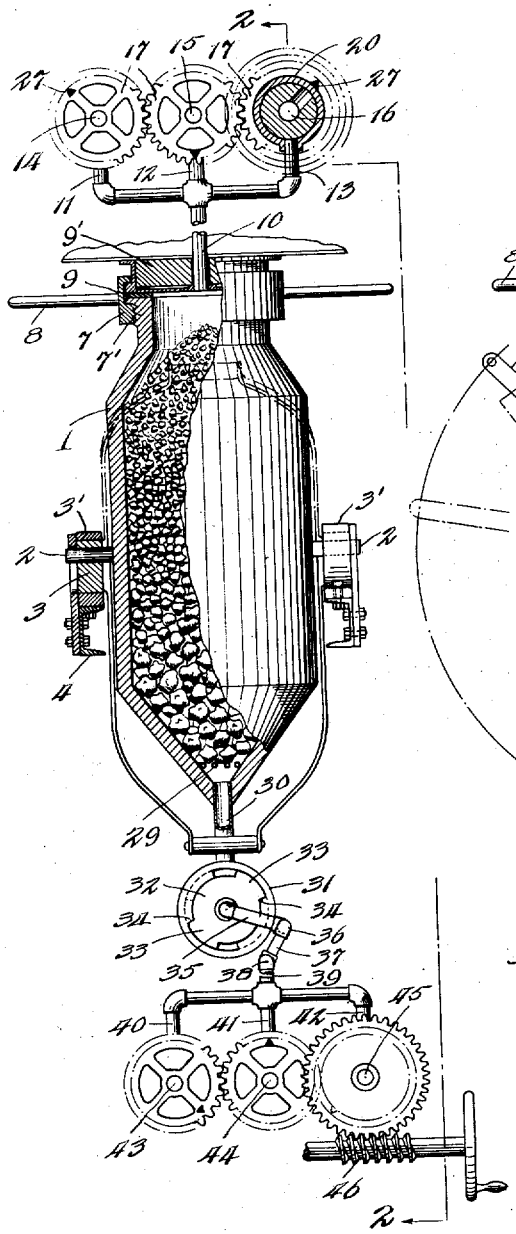

This invention relates to a process of treating any lump carbonaceous material, and especially coal, so that the material may be advantageously separated into gases, oils, and solid residues or coke with special characteristics and properties. The process is particularly adapted to the treatment of coals of mixed sizes, simultaneously, and I have discovered a method of accomplishing the distillation of the various sizes together so that each size will produce the maximum yield of best quality gas, liquid, and coke products.

I have found in distilling coal with my process that the temperature used and time allowed for the coal substance to pass through its oil-yielding range of temperature affects greatly the yield and quality of the gases, tar-oils and coke formed. Also the products may be affected similarly by the time consumed in removing the primary tar vapors from the distillation zone of the retort, whether they are permitted to remain at a constant temperature or move into zones of higher or lower temperature, and whether they are permitted to condense on the cold parts of the charge and become revaporized subsequently.

By this process, the greatest yields of best oil products are obtained when the distillation is accomplished rapidly at low temperatures and the tar vapors are swept downward through the charge of lower temperature and out of the retort. The yield of gas is small but of high fuel value. The coke is very easily kindled and is much more reactive with steam or carbon dioxide in forming water gas or producer gas than ordinary gas coke or by-product cokes. In order that the maximum amount of heat can be supplied to the coal and at the proper temperature, I use fluid heat carriers, both steam and gases, which deliver the heat to the interior of the mass of coal and equally to all surfaces of the individual lumps.

Some coals are difficult to handle in treating so as to impose the most desirable conditions of distillation due to their property of disintegrating or fusing while heating. In distilling at very low temperatures, coals of the fusing or semi-fusing types will become plastic from the surface to the center of the lumps, especially the small pieces. However, when distilled at higher temperatures the lumps will retain substantially their original form due to the surface material passing more quickly into the rigid coke structure before the entire interior is in the plastic state. It is obvious then that for any temperature and rate of heat supply the larger lumps will at all times have the greatest strength or rigidity, and I make use of this relationship to advantageously treat mixed sizes of coal simultaneously.

Small lumps have a much greater amount of surface to receive heat in proportion to their diameter and amount of coal substance than the large lumps. I have found that there is a variable relationship between the time required to distil lumps of different sizes at the same temperature and that coal of a given size which may require several hours to distil will, if finely ground, require only a fraction of a second. I prefer, however, to remove the dust size coal from the charge, to be treated separately, and confine the present process to distilling a dust-free charge with the various sizes segregated into zones having the largest lumps at the base and the smallest on the top. I apply all the above described important factors affecting the products of distillation in one process which gives very high yields of tar-oils of a primary nature, gas of high fuel value but of variable quantity, and a dense lump coke with desirable storage, kindling and burning properties. The process also combines such factors as economies in fuel, labor and capital items of cost.

Figure 2:
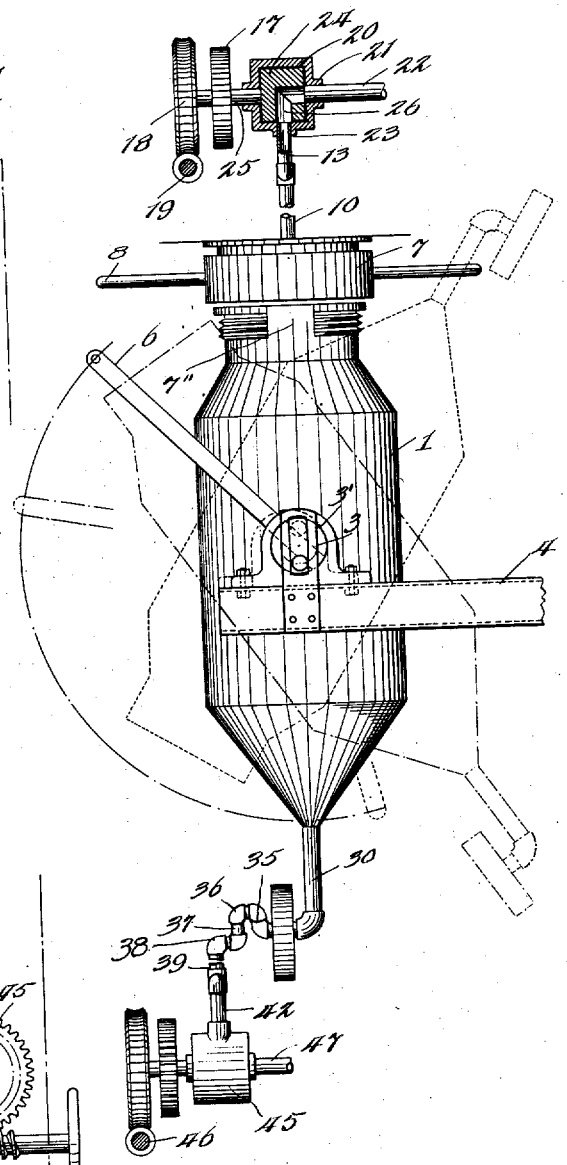
Figure 3:
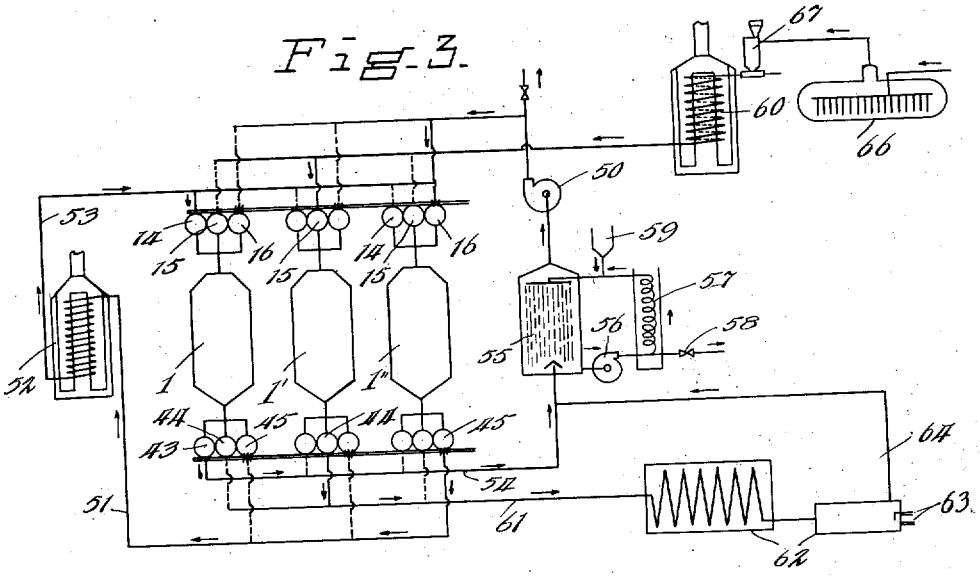
Figure 4:
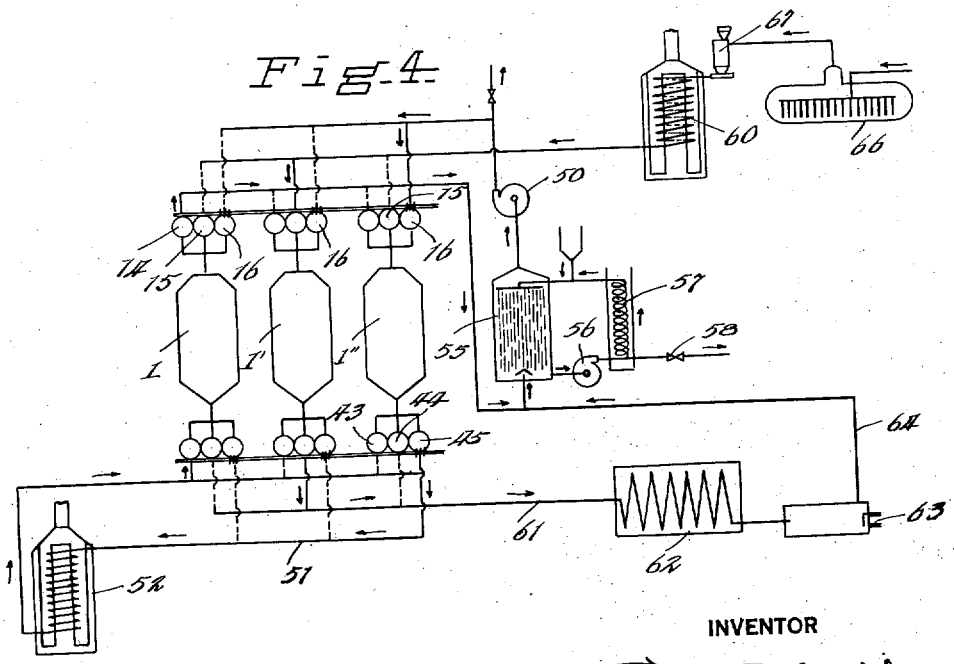

The invention will be understood from the description in connection with the accompanying drawings in which Fig. 1 is a side elevation partly in section showing one of the retorts; Fig. 2 is a side elevation taken at right angles to Fig. 1 along the line 2—2; Fig. 3 is a diagrammatic illustration showing an arrangement of apparatus for carrying out the process; and Fig. 4 is a similar diagram showing an addition in the process.

In the drawings, reference character 1 indicates a retort that is provided with a conical top and a conical bottom portion. The retort is provided with trunnions 2 near the middle thereof that are carried by cams 3 that revolve in bearings 3' upon the supports 4 so that the retort can be raised and lowered by turning the cams. Guides with slots 5 for the trunnions 2 are attached to the supports 4. A handle 6 is attached to the cams 3 by means of which the cams can be turned. The cams 3 are circular and are carried in bearings 3' that are slidable horizontally along the supports 4, and the trunnions 2 project through eccentric bearings in the cams 3 and also through the slots 5. A screw collar 7 with handles 8 is provided for the upper end of the retort. An inner threaded portion 7' of the collar 7 is cut away at intervals, leaving portions to pass longitudinally of the retort through the cut-away portions 7'' of the exterior threads along the upper end of the retort 1 so that the collar can be moved longitudinally of the retort and then turned circumferentially to make a gas tight joint with the gasket 9. A pipe 10 passes through the center of the closure 9' and is provided with three branches 11, 12 and 13 in which the valves 14, 15 and 16 are located. These valves are rotary valves and are geared together by means of the gears 17 so that they turn in unison. A pinion 18 is attached to the shaft of one of the gears 17 and is driven by means of the worm screw 19.

Each one of the valves 14, 15 and 16 comprises a housing 20 with an inlet 21 on the side thereof to which an inlet pipe 22 is connected. The lower side of the valves are provided with openings 23 through which communication is gained to the branch pipes 11, 12 and 13, respectively. A revoluble solid cylindrical member 24 is located in each housing 20 and shafts 25 from these cylindrical members extend outwardly through the housing 20 and have the gears 17 mounted thereon. Each cylindrical member 24 is provided with a radially extending hole 26 from the circumference to the center thereof communicating with an axially extending hole to the end of the cylindrical member. The holes 26 provide communication between the pipes 22 and 13 when the valve is turned into the proper position. The radial holes 26 of the respective valves 14, 15 and 16 are located 120° apart with respect to each other and the valves may be provided on the outside with markers 27 to indicate the positions of the radial portion of the holes 26.

The lower conical portion of the retort 1 is provided with cross bars or a grating 29 and below the grating an outlet pipe 30 leads from the retort to one member 31 of a screw coupler. The member 31 is disc shaped with one side hollowed out to accommodate the other member 32 of the coupler. The member 32 is of smaller diameter than the member 31 and is provided with projections 33 which pass through slots 34 in the flange of the member 31 so that the member 32 can enter the member 31 and be turned in the threads provided to make a gas-tight fit. The middle of the member 32 is connected through an elbow to a pipe 35 which in turn is connected by rotating elbows 36 to a pipe 37 and that, in turn, is connected by the rotating elbow 38 to the pipe 39 from which branch pipes 40, 41 and 42 extend. The branch pipes 40, 41 and 42 are provided with valves 43, 44 and 45 similar to the valves 14, 15 and 16 already described and similarly connected by gears and similarly driven by the worm screw 46. The valves 43, 44 and 45 are connected respectively to pipes 47 similar to the way the upper valves are connected to the pipes 22, and the valves are so connected that communication from the pipes 47 to the pipe 30 is afforded through the respective valves with their radial openings set at 120° intervals.

The operation of the retort itself is as follows: The collar 7 is turned by means of the handles 8 to disconnect the same from the retort. The handle 6 of the retort is then turned to lower the retort by means of the cams 3. The downward movement of the retort 1 causes the member 33 of the screw coupler to turn with respect to the member 31 into such a position that the two members are ready to be separated. The operator then turns the retort 1 into the dash line position in Fig. 2 and fills the same with the coarser particles at the bottom and the progressively smaller particles toward the top until the retort is practically filled. The retort is then returned to its upright position, the handle 6 turned to raise the same and the handle 8 turned to fasten the screw collar 7 to make a tight joint. The turning of the retort into its upright position causes the member 33 of the screw coupler to enter the member 31, and raising the retort 1 causes the member 33 to turn in the member 31 and make a gas tight joint. The valves 14, 15 and 16 are set so that hot gases that have been used to cool the residue of a charge in another retort are passed through the fresh charge to preheat the same as will be described more in detail below. The valves 14, 15 and 16 are then manipulated so that hot gas or superheated steam, or both, from a convenient source enters the retort 1 through the valve 15 and pipe 10 and the volatile products are carried away through the pipe 30 and branch pipe 41 by properly setting the lower valves. After the heat treatment of the material has been completed the upper valves are so manipulated that the residue is cooled and the gases that are heated in the cooling process are used for preheating a fresh charge in another retort.

Figs. 3 and 4 show arrangements in which three retorts are operated together in such a manner that the carbonaceous material is treated in three stages by different heat carrying fluids, supplied to the same so that there will first be a preheating of the charge, then distillation or carbonizing and finally dry quenching of the same. In these figures, reference characters 1, 1' and 1'' indicate retorts similar to the one already described, sets of upper and lower valves of three each being provided for these retorts as already described. Assume that the retorts 1, 1' and 1'' are in operation; that retort 1 has just been charged with a fresh charge; 1' is ready to undergo distillation and the distillation has been completed in 1'' and the residue is ready to be cooled. The upper valve 16 and the lower valve 45 of retort 1'' as well as the upper valve 14 and lower valve 43 of retort 1 are opened and the circulating pump 50 forces a cooling gas downwardly through the hot charge in retort 1'' to cool the same. The gases thereby heated pass through the pipe 51 and gas heater 52, thence through the pipe 53, upper valve 14 of retort 1, through the fresh charge in the retort 1, thus preheating the same and then passes through the lower valve 43 of retort 1 and pipe 54 into the tar trap 55 where the gases are washed by means of a cooling oil that is circulated by means of the pump 56 and heat exchanger 57 so as to be sprayed downwardly through the trap 55. The gases are recirculated until the charge in the retort 1'' is sufficiently cooled to make it safe to empty this retort. Thermocouples can be located at convenient places to measure the temperatures where desired. The oil circulated by means of the pump 56 will absorb light oils from the gases passing through the tar trap 55 and the same may be withdrawn from the circulating system at intervals or part of the oil may be withdrawn continuously through the valved pipe 58 to remove the absorbed light oils after which the cooling oil may be again introduced into the system through the supply tank 59. While the charge in retort 1'' is being cooled and the charge in retort 1 is being preheated, the charge in retort 1' that has already been preheated is being treated with superheated steam or gas or both, obtained from the gasifier or superheater 60, that is described in detail in my application Serial No. 290,352, filed July 5, 1928, the upper valve 15 of the retort 1' and the lower valve 44 of the same being open to permit the treating gases to enter the retort 1' through valve 15 and the volatile products resulting from the heat treatment to pass through the pipe 61 into the condenser and separator 62. The liquid products are withdrawn through the outlets 63 and the uncondensable products pass through the pipe 64 and thence through the tar-trap or scrubber 55.

After the charge in retort 1'' has been cooled, the charge in retort 1 heated, and the heat treatment of the charge in the retort 1' has been finished, the valves are moved 60°, to shut off the retorts from the pipe lines. The retort 1'' is then emptied and charged with fresh material as described above and the valves are then turned 60° further, thereby causing cooling gases to pass through the upper valve 16 of retort 1', lower valve 45 of the same and thence through the heater 52 and valve 14 of the retort 1'' to preheat the charge in retort 1'', the heated gases being circulated by the pump 50. During this period the valves 15 and 44 of the retort 1 are open so that the charge in this retort is heat-treated by means of the superheated steam or mixture of superheated steam and water gas from the superheater-gasifier 60 and the volatile products pass from the retort 1 through the pipe 61 and its condenser and separator 62 as described above. The valves are again moved 60° when the heat treatment in retort 1 and cooling treatment in retort 1' and the preheating in 1'' are finished, the retort 1' is discharged and recharged with fresh material, the valves are turned 60° further, thereby advancing the operation one retort in the cycle in the way already described. This continues indefinitely, thus making a practically continuous process by operation of the three retorts in sequence as described.

In the arrangement of apparatus shown in Fig. 4, the operation is similar to that described in connection with Fig. 3 except that the pipe connections are such that the gases that are passed downwardly through the hot charges for cooling the charges before emptying the retorts are passed through the heater 52 and thence upwardly through the retort that contains a fresh charge to be preheated. It is not believed necessary to describe the operation in detail as it is similar to that described in connection with Fig. 3 except that the hot gases for preheating fresh charges are passed upwardly through the respective retorts. This procedure is desirable in treating the coals of the more fusible types for the purpose of advancing the carbonization on the surfaces of the large lumps of coal so that as the distillation progresses the surfaces of the lumps quickly assume a rigid coke structure and are prevented from excessive fusing or disintegration; the gas used for preheating the coal is heated to a higher temperature than when used for preheating the less fusible coal.

In the operation of this process the first or preheating treatment of the carbonaceous material is accomplished by means of gases not readily condensable evolved from the process, the second treatment of the charge is by means of superheated steam or a mixture of superheated steam and water gas, and the third treatment is by means of gases not readily condensable from the process. In this way the sensible heat of the treated charge in each retort is utilized to preheat a fresh charge in another retort while the material in the third retort is undergoing distillation with superheated steam or a mixture of superheated steam and water gas from an external source.

It has been found that it is necessary to apply heat gradually to large lumps of coal of low rank in order to reduce their tendency to break apart. With such coal it will be advisable to operate the process as described in connection with Fig. 3 because in starting to preheat the charge of coal the hot gases for preheating the coal enter the retorts at the top and quickly give up a portion of their heat to the fine coals at the top, and they will thereby be cooler when they reach the larger lumps lower down in the retort.

In operating this process very little light oil is produced in treating carbonaceous materials but large quantities of tar oils are produced because, as the tar oils are formed within the coal substances, they are quickly removed by the steam and gaseous media and are carried into a cooler zone. Some of the heavy portion of the tar oil condenses on the lower particles of coal particularly in the early stage of the distillation of the charge but the tar-oil flows constantly downward and out of the retort, thus preventing any refluxing in the hot zone which would cause redistillation, cracking and production of more volatile liquid products but a smaller total yield of tar-oils. The tar-oils are of a primary nature and free from suspended carbon. They contain a large proportion of wax-like materials of high melting point and very little pitch-like ingredients. I have found that the tar-oils formed from many coals by my process are suitable for cracking into motor fuels and tar acids by the usual methods for cracking petroleum.

The gasifier-superheater 60 is operated by introducing steam from the steam source 66 together with fine coal through the feeder 67 and by controlling the temperature and ratio of the steam and carbon entering the gasifier 60, the character of the mixture for treating the coal can be controlled to vary the character of the products that are produced by this process. For instance, if a large surplus of steam to carbon is used in the gasifier-superheater, the issuing fluids will be largely steam and some water gas of relatively low fuel value, but the fuel value of the resulting gas from the coal treatment will be high because of the small amount of diluent water gas present. However, if a surplus of carbon is used in the superheater-gasifier and the temperature is high, the issuing fluids will be largely water gas of maximum fuel value, but the resulting gas from the coal treatment will be low due to the larger amount of diluent water gas. In the first case the water gas may be of approximately 225 B. t. u. per cubic foot, whereas, in the second case it may be as high as 320 B. t. u. On the other hand if a large surplus of steam of high temperature is delivered to the mass of coal, there will be a considerable quantity of water-gas formed by the steam contacting with the fine coke in the top of the retort. Thus, by varying the quantities and the ratio of steam to coke used in the superheater-gasifier, the temperature of their reaction, and the temperature at which the fluids are contacted with carbonaceous material in the top of the retort, it is possible to vary the yield and fuel value of the resulting gases to suit the market demands and, the yield and properties of the primary tar-oils will be substantially unaffected while the desirable properties of a dense dry-quenched low-temperature coke are preserved.

In order that my process for treating coal will serve conveniently as an adjunct to a steam power plant or other possible source of processing steam, I prefer to provide a steam accumulator 66 which serves as a balancing reservoir between a varying source of steam, such as turbine exhaust, and the retorts which, individually, draw intermittently on the steam supply. When the various units and batteries of retort are operating in unison, the steam flow to the retorts will become more nearly constant but an accumulator of proper size will not only supply steam of substantially constant pressure, which would not be the case if connection to the superheater-gasifier 60 were made to the exhaust line from a prime mover, but the accumulator serves also to stabilize the back pressure on the prime mover. The accumulator may be connected to a line carrying steam bled from a stage which normally serves to heat the feed water and the accumulator serves thereby as a reservoir for heated feed water.

I claim:

1. The process of treating batches of solid carbonizable material in retorts which comprises establishing a plurality of batches of substantially dust-free solid carbonizable material, each batch being formed into segregated zones of differently sized material with the largest lumps at the base and the smallest lumps at the top, preheating the material in one of the batches by passing a gas therethrough from the base to the top, further heating and carbonizing the material in said one of the batches by passing a gaseous heating medium at a higher temperature downwardly through the same so as to remove the volatile constituents from the material leaving a hot solid residue, condensing at least a portion of the volatile constituents, passing through the hot solid residue from the top to the bottom thereof a cooling gas substantially chemically inert with respect thereto so as to cool the heated residue and passing the said cooling gas, thereby resultantly heated, in heat exchange relation to a fresh charge of carbonizable material in another of the batches for preheating the same.

2. The process of treating batches of solid carbonizable material which comprises establishing a plurality of batches of substantially dust-free solid carbonizable material. each batch being formed into segregated zones of differently sized material with the largest lumps at the base and the smallest lumps at the top, preheating the material in one of the batches by passing a gas therethrough from the base to the top thereby contacting the heating medium first with the larger size material and progressively with the smaller size material, then carbonizing the preheated material by passing superheated steam downwardly therethrough so as to remove the volatile constituents from the material and leave a hot solid residue, passing through the hot solid residue from the top to the bottom thereof a cooling gas substantially chemically inert with respect thereto so as to cool the heated residue, and passing the inert gas thereby resultantly heated in heat exchange relation to a fresh charge of the carbonizable material in another of the batches for preheating the same.

3. The process of treating solid carbonizable material which comprises simultaneously treating a plurality of batches of the material at different stages of the process to effect a preheating of one of the batches while substantially completely carbonizing a second one of the batches and while dry-quenching a third one of said batches, each batch of material being formed into segregated zones of differently sized material with the largest lumps of material at the base and the smallest at the top, and the preheating of the said one of said batches being effected by first introducing a gaseous heating medium into the zone of larger material at the base, while the dry-quenching of the said third one of said batches is effected by first introducing a gaseous quenching medium into the zone of smaller material to the top, the hot gas from the quenching constituting the heating medium for preheating a further batch of material as the process progresses whereby an exchange of heat from the dry-quenching operation to the preheating operation is effected.

4. The process of treating solid carbonizable material in a retort said material being formed of different sized lumps and segregated into layers of various sizes, the layers of the larger lumps being at the bottom and progressively smaller at the top of the retort, preheating the material by passing a gas through the retort from the bottom to the top, then carbonizing the preheated material by passing a heating gas at a higher temperature through the retort from the top to the bottom.

5. The process of treating solid carbonizable material in a retort, said material comprising different-sized lumps, segregating said material into layers of different sizes in the retort, the larger lumps being at the bottom and supporting superposed layers of progressively smaller lumps of the material toward the top of the retort, and carbonizing the material by passing a heating gas through the retort from the top to the bottom.

6. The process of retort-treating solid carbonizable material normally including a plurality of differently-sized lumps, segregating the lumps into groups respectively differing as to sizes of lumps including forming a stratum of lumps of a larger size, superposing thereon a stratum of lumps of a smaller size and carbonizing the material by passing a heating gas successively through the upper and lower strata respectively.

7. The process of retort-treating solid carbonizable material normally including a plurality of differently-sized lumps which consists in freeing the material from dust, segregating the dust-free material into groups respectively differing as to sizes of lumps including forming a stratum of lumps of a larger size, superposing thereon a stratum of lumps of a smaller size, and carbonizing the batch so formed by passing a heating gas successively through the upper and lower strata respectively.

8. The process of retort-treating solid carbonizable material normally including a plurality of differently-sized lumps which consists in segregating the material into groups respectively differing as to sizes of lumps, forming a charge of said groups characterized in that the largest lumps are at the bottom and the sizes of lumps gradually decreasing toward the top, the smallest lumps being at the top of the charge, and carbonizing the material by passing a heating gas from top to bottom through the charge.

9. The process of retort-treating solid carbonizable material normally including a plurality of differently-sized lumps which consists in segregating the material into groups respectively differing as to sizes of lumps, forming a charge of said groups characterized in that the largest lumps are at the bottom and the sizes of lumps gradually decreasing toward the top, the smallest lumps being at the top of the charge, carbonizing the material by passing a heating gas from top to bottom through the charge to distill the material comprising the charge, stopping the distillation partway down by discontinuing the passage of the heating gas and resuming the distillation with dry quenching gas by passing said dry quenching gas downwardly through the charge, said dry quenching gas absorbing the heat from the upper portions of the charge to promote distillation of the material of the lower portion of the charge.

10. The process of treating solid carbonizable material in a retort, said material comprising a mass of differently-sized lumps characterized in that the supporting strength of the lumps during heating corresponds directly with the size of the lumps, segregating said material into layers of various sizes in the retort, the larger lumps being at the bottom to enable supporting of maximum weight and supporting superposed layers of progressively smaller lumps of the material toward the top of the retort, and carbonizing the material by passing a heating gas through the retort from the top to the bottom.

11. The process of treating solid carbonizable material in a retort, said material comprising different-sized lumps of coal, which includes segregating said coal into layers of different sizes in the retort, the larger lumps being at the bottom and supporting superposed layers of progressively smaller lumps of the material toward the top of the retort, and carbonizing the material by passing a heating gas through the retort.

LEWIS C. KARRICK.